United States Patent
Vogenthaler et al.

(10) Patent No.: US 7,512,890 B1
(45) Date of Patent: Mar. 31, 2009

(54) PROGRAMMATICALLY SPECIFYING THE STATE OF GRAPHICAL USER INTERFACE (GUI) CONTROLS

(75) Inventors: Alexander R. Vogenthaler, Boulder, CO (US); Roger B. Milne, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 441 days.

(21) Appl. No.: 11/189,680

(22) Filed: Jul. 25, 2005

(51) Int. Cl.
*G06F 13/00* (2006.01)
*G06F 15/00* (2006.01)

(52) U.S. Cl. .................................. 715/744; 715/765
(58) Field of Classification Search ................ 715/744, 715/808, 866, 763–765, 853
See application file for complete search history.

(56) References Cited

U.S. PATENT DOCUMENTS

| | | | | |
|---|---|---|---|---|
| 5,798,757 A | * | 8/1998 | Smith | 715/709 |
| 5,844,554 A | * | 12/1998 | Geller et al. | 715/744 |
| 6,754,855 B1 | * | 6/2004 | Denninghoff et al. | 714/48 |

* cited by examiner

*Primary Examiner*—Kevin Nguyen
(74) *Attorney, Agent, or Firm*—Thomas A. Ward; Kevin T. Cuenot

(57) ABSTRACT

A graphical user interface (GUI) is provided with a specifiable edit control field that is accessed in conjunction with a non-edit field, the non-edit field for example being a check box, or radio buttons. The specifiable edit field can be accessed for example by right clicking or double clicking on the non-edit field or overall GUI. The specifiable edit field allows changing parameters of the non-edit field via entry of a programmatic expression that evaluates to an valid input to the non-edit field. For example in a high-level modeling program that enables modeling modules of a Field Programmable Gate Array (FPGA), when a normal editing field can modify only one module at a time, the specifiable editing field can allow modifying a plurality of modules at one time that are hierarchically linked together by the associated non-edit field, such as a check box.

19 Claims, 5 Drawing Sheets

US 7,512,890 B1

PROGRAMMATICALLY SPECIFYING THE STATE OF GRAPHICAL USER INTERFACE (GUI) CONTROLS

BACKGROUND

1. Technical Field

The present invention relates to edit fields as well as non-edit fields, such as check boxes, list boxes, and radio button groups, provided with a Graphical User Interface (GUI) allowing computer users to interact with running programs. More particularly, the present invention relates to programmatically setting up or modifying a GUI.

2. Related Art

GUIs are a primary way computer users interact with running programs. Many familiar programs use GUIs, e.g., Microsoft Word, Quicken, Internet Explorer, and Excel. GUIs contain graphical elements, called controls, with which the user interacts in order to provide input to the program. Examples of the GUI controls are check boxes, list boxes, radio buttons, and edit fields that are all illustrated in the selection menu shown in FIG. 1. The GUI of FIG. 1 is used to set parameters for an adder/subtractor in a high-level modeling system.

Each type of GUI control is suited to a particular type of input. A check box 2, for example, displays a setting that can be checked (set) or unchecked (not set) allowing one of two opposing choices. The check box is ideal when a program wants a Boolean type input from the user, such as a choice such as between on/off, hot/cold, large/small, or whether a carry input or carry output is provided as shown in FIG. 1. Radio boxes 4 provide a greater number of choices than the check box, with only one of the buttons being selectable at a time. The radio boxes 4 shown in FIG. 1 enable selection of one of the options of truncating or rounding the output of an adder. A list box 6, similar to the radio box, displays a list of choices, allowing the user to highlight and select one of the choices. The list box 6 shown in FIG. 1 includes a drop down menu that can be accessed by clicking the down arrow, enabling a user to highlight one of the possible selections before typing a return to activate the highlighted selections. Check boxes, radio boxes and list boxes provide selection capability, but not the capability of editing an arbitrary input.

In contrast, edit fields, such as edit field 8 in FIG. 1, are suited to situations where a program does not want to constrain user input, or only constrain it to a small degree. The edit field 8 in FIG. 1 allows a user to input the amount of clock cycles of latency desired for the adder/subtractor. The user can insert a number such as the number 2 shown, or another number such as 8, 23 or 41. Other examples of edit fields are the address line in a web browser and the formula bar in an Excel spread sheet.

FIG. 2 shows a further example of a GUI, the print GUI from Microsoft Word. The GUI of FIG. 2, similar to FIG. 1, contains non-edit fields such as radio boxes 20, list boxes 21-25 and a check box 26. The GUI of FIG. 2 further contains edit fields 28-29. As with FIG. 1, the edit fields in FIG. 2 allow a user to enter data, such as the number shown indicating a number of pages or a number of copies desired. Literals like "22" or "hello", etc. can be entered in the dialog box 28, that are not interpreted by system software. Unlike the "literals" entered in the edit field 28 of FIG. 2, "expressions" can be entered in the edit field 29 that are interpreted by software. "Expressions", like a listing of pages 2, 7 and 14 in the edit field 29, allowing a selection of several pages to be printed at one time, are more complex and, thus, distinguishable from "literals".

FIG. 3 show yet another example of a GUI, the Environment Variables control panel from Microsoft Windows. The Environment Variables GUI control panel includes environment variables 31-32 that can be set by expression values entered in the edit fields 41-42. The language of the "expression" values 41-42 being interpreted in FIG. 3 are significantly more complex than the "literals" used in edit field 28 of FIG. 2, allowing, users to define parameters to set environment variables 31-32.

The GUI examples shown in FIGS. 1-3 provide three examples among many examples of GUIs used by software systems that include edit and non-edit fields. Non-edit fields, as referenced herein, are non-editable in the sense that a user can only change the state of the field, whereas in an edit field a user can enter a variable or expression.

The example of FIG. 1 is from a high-leveling modeling system that is the combined MATLAB and Simulink, both made by MathWorks, Inc., allow modeling of components of a Digital Signal Processor (DSP). System Generator for Digital Signal Processors (DSPs) by Xilinx, Inc. of San Jose, Calif. is further used to automatically translate a DSP system developed using MATLAB and Simulink software into highly optimized hardware description models and intellectual property (IP) cores or modules that are programmed into Xilinx Field Programmable Gate Arrays (FPGAs).

For reference in understanding the GUI of FIG. 1, a block diagram of components of a conventional FPGA is shown in FIG. 4. The FPGA includes input/output (IOBs) blocks 52 (each labeled IO) located around the perimeter of the FPGA, multi-gigabit transceivers (MGT) 54 interspersed with the I/O blocks 52, configurable logic blocks 56 (each labeled CLB) arranged in an array, block random access memory 58 (each labeled BRAM) interspersed with the CLBs, configuration logic 62, configuration interface 64, on-chip processor 66 and an internal configuration access port (ICAP) 40. The FPGA also includes other elements, such as a programmable interconnect structure and a configuration memory array, which are not illustrated in FIG. 4.

In general, the FPGA of FIG. 4 is programmed in response to a set of configuration data values that are loaded into a configuration memory array of the FPGA. The internal configuration memory cells define how the CLBs 56, IOBs 52, BRAMs 58 and interconnect structure are configured. Configuration data is provided to the configuration memory cells as a bitstream from an external memory (e.g., an external PROM) via configuration interface 64 and configuration logic 62. As another alternative, the FPGA can be reconfigured by rewriting data in the configuration memory array using the ICAP 60.

As one example of programming a module into FPGA, a CLB 56 can be configured to form an Adder/Subtractor. The Adder/Subtractor is created as one of a number of modules using the MATLAB and Simulink software. The GUI shown in FIG. 1 enables parameters to be set, such as latency for the adder and whether a carry is used. System Generator interacts with MATLAB and Simulink so that GUIs are presented to a user to set necessary parameters. For example, if a System Generator user wants to set the number of bits that should result from an addition operation, the user opens a MATLAB and Simulink GUI containing an edit field in which to enter the desired number of bits, e.g. 64.

A convenient feature of edit fields in MATLAB is that it allows a user to express the same information in a variety of ways. Instead of entering 64 in the edit field for number of output bits, the user could equally well enter 2^6 ($2^6$). MATLAB further has the ability to interpret a programming language known as m-code, and users can enter any valid m-code expression into an edit field, including function calls. The m-code enables a user, for example, to make the number of output bits in the previous example of an adder depend on virtually anything: the precision of a preceding multiply, the size of FPGA being used, or the day of the week. This expressive ability in an edit field provides a significant benefit to System Generator.

MATLAB is not the only program that permits expressions in edit fields, as shown with the GUIs of FIGS. 2 and 3. As a further example, the Microsoft Word print dialog shown in FIG. 2 allows a user to enter a comma-separated list of pages in the Microsoft Word print dialog. E.g., if a user wants to print pages 5, 7 and 22, the user can enter "5, 7, 22" in the "Pages:" edit field. As a further example, Microsoft Excel allows users to enter complex interpreted expressions in edit fields throughout the program.

It would be desirable to provide GUIs with fields enabling even more user versatility in interfacing with a program, either in a combined Matlab and Simulink high-level modeling program, or other programs like Microsoft Word and Microsoft Windows.

SUMMARY

Embodiments of the present invention can be made with recognition that programs providing GUIs have a limitation: edit fields are typically the only GUI controls that can accept an arbitray input, and thus are typically the only controls whose state can be set via expressions. Because of this, users are often unable to parameterize GUIs to the extend they desire, simply because some control happens to not be an edit field.

Accordingly, embodiments of the present invention provide: (1) a GUI that allows users to enter expressions for non-edit field controls, such as list boxes, radio button groups and check boxes; (2) a construction of the expressions entered in conjunction with non-edit fields in such a way that their results can easily be mapped to the set of valid states for each type of GUI control; and (3) recognition by code that reads the GUI settings to obtain information according to how the user defined controls for the expressions, allowing downstream code to remain ignorant as to whether the user has provided a control expression eliminating a need to modify this code.

According to embodiments of the present invention, a user accesses a GUI to enter expressions in non-edit fields in modern windowing systems in one embodiment by having the user right mouse click on the appropriate control and enter an expression field in a pop-up menu, or in other embodiments by having a user double click or select from a menu bar to access the pop-up menu to enable entering an expression. Thus, the bulk of controls in a GUI remain in their default, easy-to-use mode, while the controls can be switched to advance modes that accept expressions.

The natural graphical representation for a control in its advanced mode is an edit field, into which a user can then enter an expression that defines the state of the underlying GUI control. In other embodiments, other ways to input an expression that determines the state of the underlying control are provided, e.g., selecting a function name from a browse window, or specifying an expression in an external file.

The expressions used to define the state of GUI controls can be designed to meet certain requirements, depending on the type and contents of the GUI control and the scripting language used by the software program (e.g., the Matlab programming language or the Microsoft Windows environment variables as shown in FIG. 3). If an expression is used to define the state of a check box, for example, the expression can be set to evaluate to a boolean value, such as 0/1 "on"/"off", etc. If an expression is entered for a list box or radio button control it can be set to evaluate to an index of one of the entries, or to a value that somehow represents one of the entries.

Reading and evaluation of the expressions and returning the result is performed by the machinery that presents the GUI and maintains the state of the GUI variables. In this way, modularity is maintained, interfaces remain simple, and downstream code that consumes settings made in the GUI can safely remain unaware of whether any controls are being defined via expressions.

In addition to high-level modeling systems, such as MATLAB and Simulink, other programs that present GUIs benefit from such flexibility and programmability provided by embodiments of the present invention. Although external procedures may be performed to iterate through GUI controls to establish the controls to be affected, entering programming using the GUI itself according to embodiments of the present invention provides an inexpensive and less time consuming method. For example, in the Windows print GUI dialog box using embodiments of the present invention a user can right click on the GUI and obtain a menu similar to the Windows environment variables menu enabling expressions to be entered to alter the print dialog box. The print dialog could be altered, for example by entering an expression to change the radio box item "print current page" to "print last page."

BRIEF DESCRIPTION OF THE DRAWINGS

Further details of the present invention are explained with the help of the attached drawings in which.

DETAILED DESCRIPTION

Embodiments of the present invention allow non-edit fields of a GUI to be set via expressions. This enables a user to parameterize GUIs to the extent desired, even if the relevant controls do not happen to be edit fields. Examples provided according to embodiment of the present invention are described with respect to the GUI of FIG. 1 used in a high-level modeling system for convenience, although other GUIs can readily benefit from this embodiment of the present invention.

Figure 1:
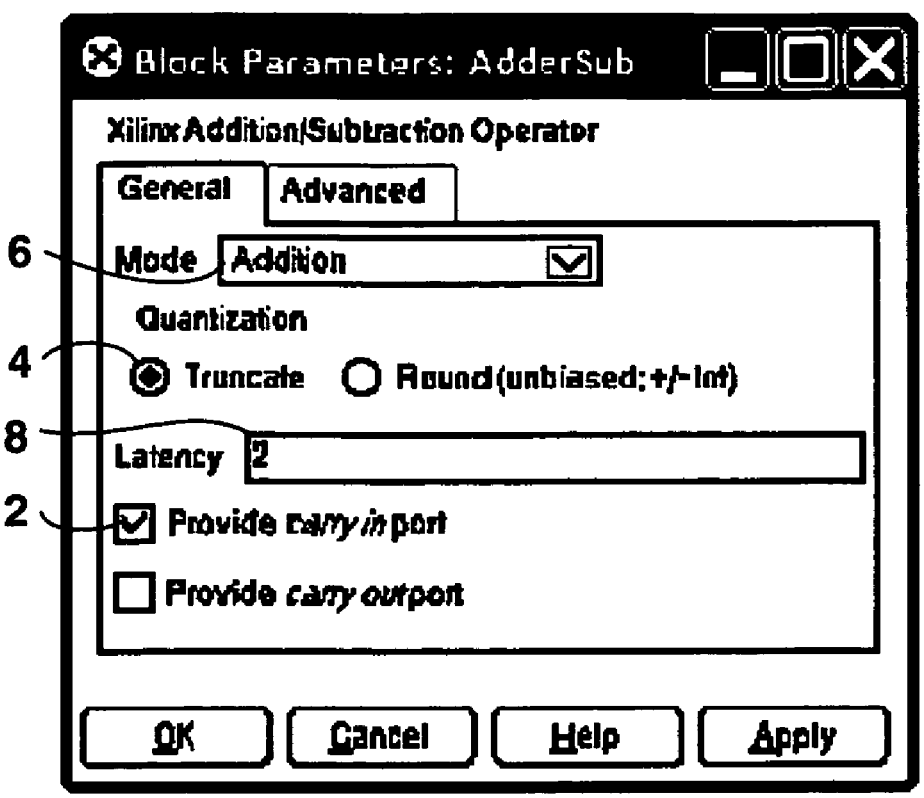
FIG. 1 shows a typical GUI from a high-level modeling system containing check boxes, list fields, radio buttons and edit fields.
Figure 2:
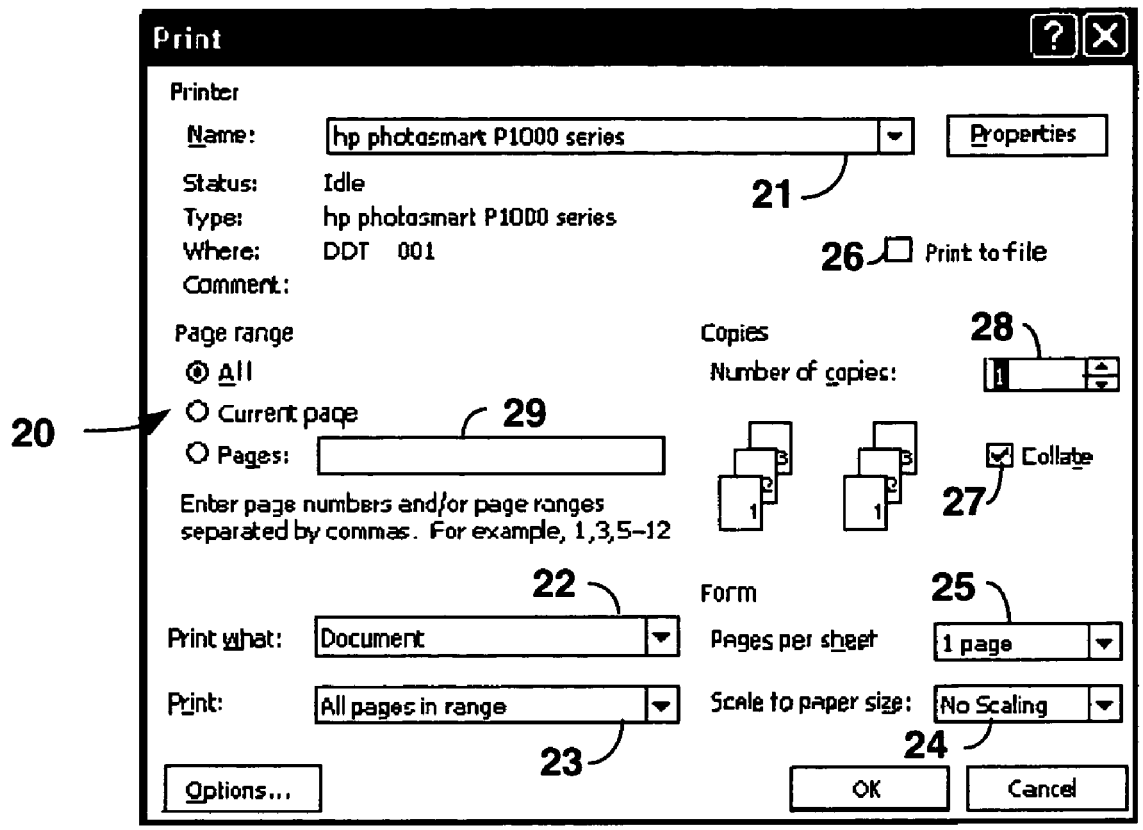
FIG. 2 shows a further example of a GUI, the print GUI from Microsoft Word.
Figure 3:
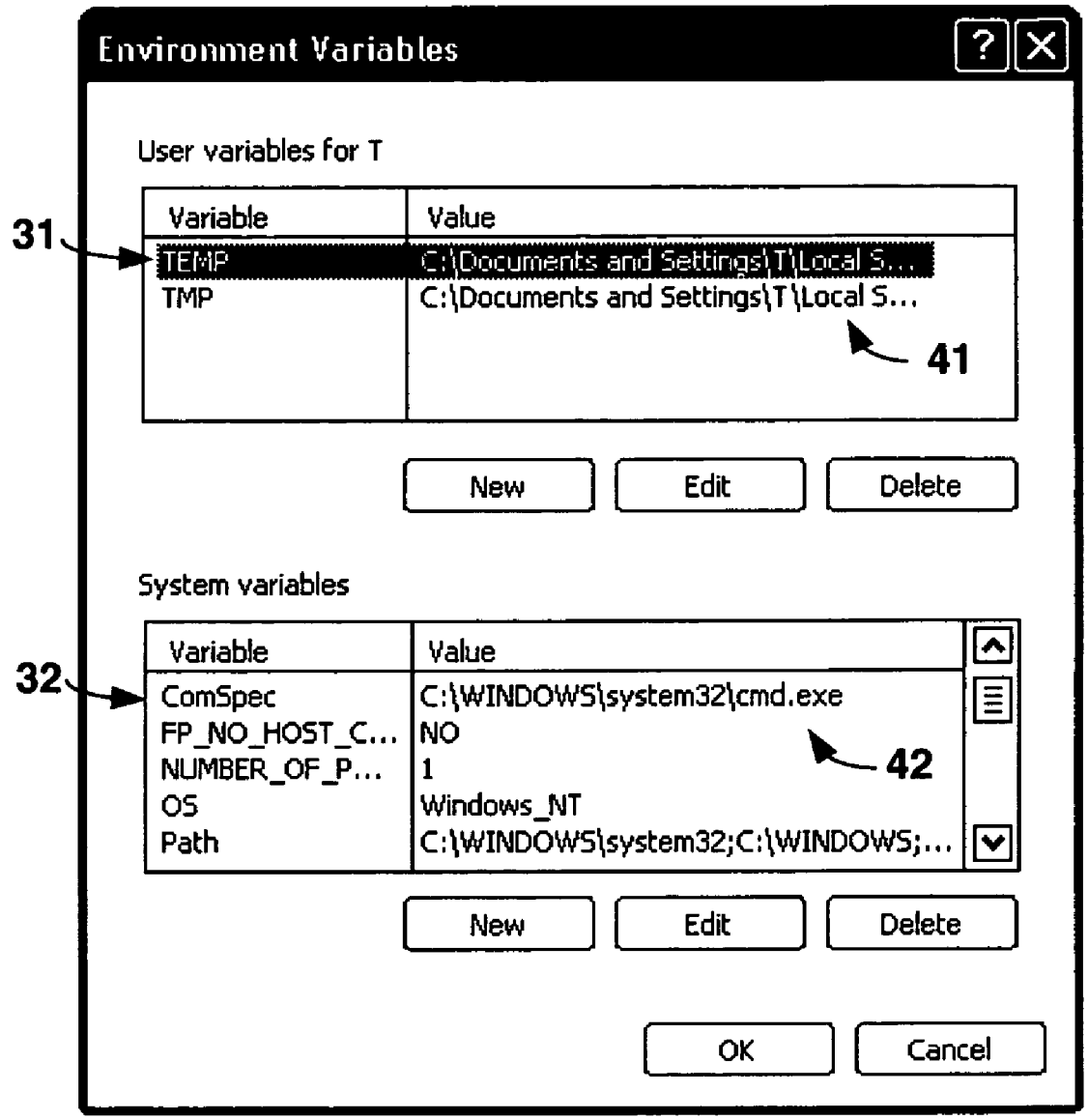
FIG. 3 show yet another example of a GUI, the Environment Variables control panel from Microsoft Windows.
Figure 4:
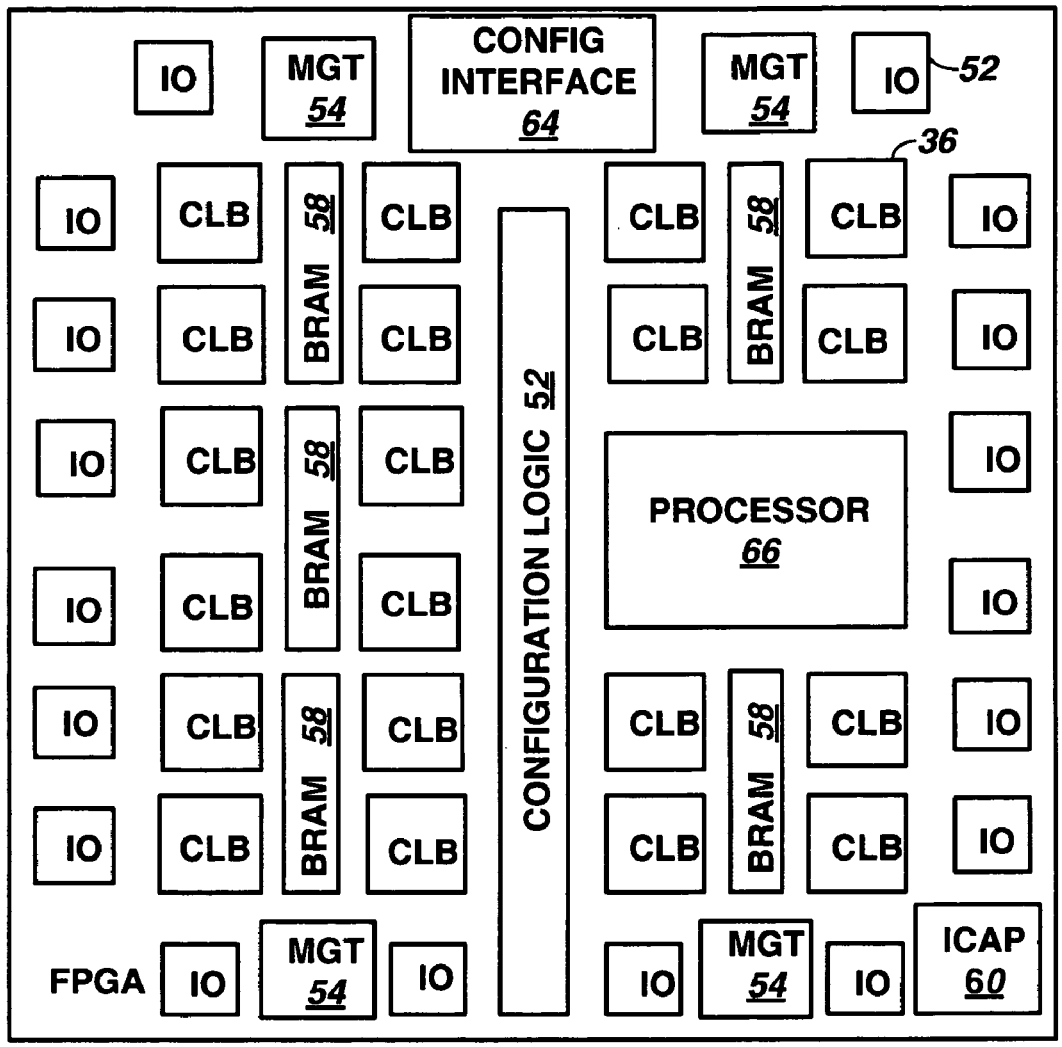
FIG. 4 shows block diagrams of typical components of a Field Programmable Gate Array (FPGA)

Referring to the GUI of FIG. 1 when designing a large adder tree, for example, a user might like to programmatically configure the latency edit field and the quantization radio button groups for each adder in the subsystem. To configure latency, the user would not need to make separate changes and could simply write a function adder_latency( ) that does the appropriate calculation, presumably based on some relevant characteristics of the parent subsystem, and enter the expression adder_latency( ) into the edit field. The user could not previously, however, set the type of quantization performed by each adder via an expression, because MATLAB GUIs only support expressions in edit field controls, and quantization happens to be a radio button group. As a result, the user had to open the GUI for each adder and change the state of quantization control manually or, alternatively, write an external procedure that iterates through and configures each adder. In either case, the encapsulation of the hierarchical design must be broken. Moreover, from the user's perspective, it does not make sense to have to treat quantization differently than latency, simply because their graphical representations differ.

One solution to this problem is to eliminate check boxes, list boxes, and all other GUI controls that do not accept arbitrary input. Edit fields would be the only controls left. This, however, would be quire an unappealing, hard-to-use interface.

Another solution, according to embodiments of the present invention, is to allow users to selectively switch any GUI control, regardless of type, into a mode that accepts an expression defining the control's state. One way to select the GUI control state in a modern windowing system is to have the user right mouse click on the appropriate control and select from a pop-up menu the preferred mode. In addition to right clicking, in other embodiments switching control states can be accomplished by other means, such as double-clicking or selecting from a menu bar. Thus, the bulk of controls in a GUI remain in their default, easy-to-use mode, while the controls can easily be switched to advance modes that accept expressions. The natural graphical representation for a control in one embodiment is the edit field, into which a user can enter an expression that defines the state of the underlying GUI control. In other embodiments, however, other ways to input an expression that determines the state of the underlying control are allowed, e.g., selecting a function name from a browse window, or specifying an expression in an external file.

In one embodiment of the present invention, once the state is changed from a first control by right clicking or otherwise, the first control is made inactive. Inactivating the first control while the second control (the edit field containing the expression) is used to determine the state of the first (original) control prevents errors from occurring should the first control still be interacting with operational software while the second control makes modifications.

Figure 5:
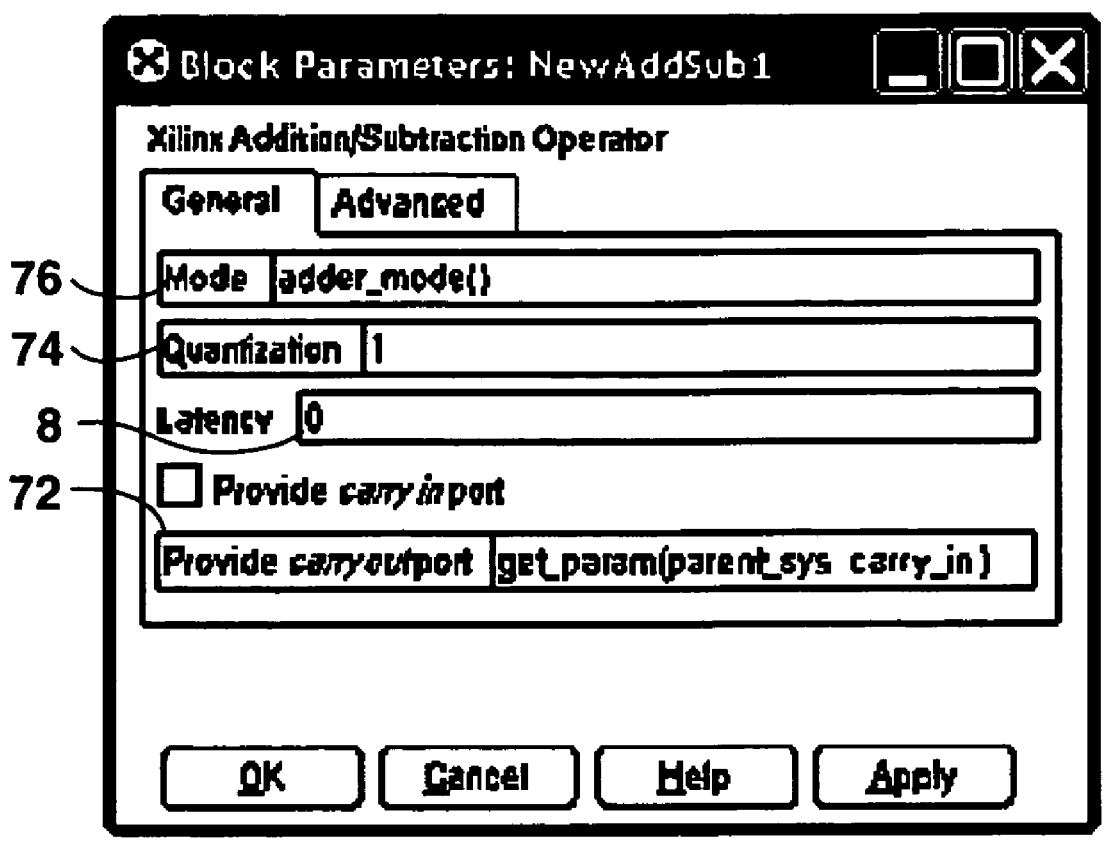
FIG. 5 shows a GUI interface containing an expression field for an embodiment of the present invention that allows non-edit controls to be configured via expressions.

FIG. 5 shows a GUI interface containing an expression field for an embodiment of the present invention that allows expressions to be entered to modify non-edit controls. The GUI of FIG. 5 is accessed from the GUI of FIG. 1 for purposes of example only, although other GUIs could similarly provide access for expression field modification. The GUI interface of FIG. 5 is accessed from the GUI interface of FIG. 1 using an access method described above, such as right clicking or double clicking on the GUI of FIG. 1. The GUI of FIG. 5 presents controls allowing expressions to be entered to configure non-edit fields from FIG. 1. Initially, the list box 6 of FIG. 1 has parameters accessible by an expression 76 in FIG. 5, for the adder mode. The code "adder_mode( )" shown is a simplistic example of what is possible when using expressions to programmatically set GUI controls. Any expression that can be interpreted by the language underlying the software package can be valid, as long as it returns a value that is able to be mapped to the discrete set of choices already present in the underlying (non-edit field) control. Further, the radio boxes 4 of FIG. 1 have quantization parameters accessible by an expression field 74. The expression entered in field 74 can be any number of expressions acceptable by software as long as it maps to a predefined set of choices that already exists for the original (non-edit field) control. The edit field 8 for defining latency remains unchanged between FIG. 1 and FIG. 5 since it already allows expressions to be entered. Finally, the check box field 2 of FIG. 1 has parameters modifiable using the expression field 72.

Although all the GUI expression fields 72, 74 and 76 of FIG. 5 are shown accessed together, in one embodiment the GUI expression fields 72, 74 and 76 can be separately accessed and provided with their own GUI window by accessing the corresponding field shown in the GUI of FIG. 1. The individual GUI windows can be accessed by a method such as double clicking or right clicking in the area of the corresponding field in FIG. 1. Further, although shown with particular expressions entered in the fields 72, 74 and 76, other appropriate code can be entered in the expression field areas to define parameters of the corresponding GUI controls in FIG. 1. Additionally, although FIG. 1 shows particular MATLAB non-edit fields that can be edited using expressions accessed as shown in FIG. 5, other software including non-high level modeling system software can likewise benefit from improved access to a GUI interface. Almost any program that has at least a rudimentary scripting language or some notion of state variables could use the improved GUI provided by embodiments of the present invention.

To maintain the underlying GUI control, according to embodiments of the present invention expressions entered to define the state of a GUI control are set to meet certain requirements, depending on the type and contents of the GUI control. For example, if the expression is used to define the state of a check box, the expression is set to evaluate to a Boolean value, or a numerical 0 or 1 value, etc (Boolean tends to mean the literals true or false, so it is understood here that numerical values, or other indications for check box states can be used equally well. If an expression is entered for a list box or radio button control it is set to evaluate to an index of one of the entries for the box or button, or to a value that somehow represents one of the entries. For example, the expression may be a character string identical to one of the entries, etc.

To minimize programming required, expressions accepted in the expression GUI fields are limited to providing an expression to set a control, and a further burden of evaluating the expressions and generating changes in the GUI non-edit fields is placed on the software that presents the GUI and maintains the state of the GUI variables. In this way, modularity is maintained, interfaces remain simple, and downstream code that consumes settings made in the GUI can safely remain unaware of whether any controls are being redefined via expressions. The expressions entered to redefine a non-edit GUI control will depend on the software presenting the GUI. Like expressions enterable in edit fields, expressions will be software dependant. Expressions can be a simple line of source code in whatever computer language that can be understood by the software program. More complex expressions can likewise be provided enabling software presenting the GUI to set parameters for the corresponding GUI control.

The broad applicability of embodiments of the present invention is evidenced by the variety of scripting languages, such as Microsoft's Visual Basic for Applications and Apple's Apple Script, that allow users to programmatically interact with graphical applications. Neither of these solutions, however, allows the user to enter programming into a non-edit field of a GUI. Instead, a procedure must be executed externally. An external procedure however must iterate through all GUIs containing controls it may want to affect, an expensive and difficult operation, especially in the face of complex, recursive program structures. In comparison, embodiments of the present invention maintain modularity and clean interfaces by having the GUI itself store and evaluate expressions, hiding the details from code external to the GUI.

Although the present invention has been described above with particularity, this was merely to teach one of ordinary skill in the art how to make and use the invention. Many additional modifications will fall within the scope of the invention, as that scope is defined by the following claims.

What is claimed is:

1. A computer-readable medium having stored thereon a plurality of instructions, the plurality of instructions including instructions which, when executed by a processor, cause the processor to perform a method for interfacing with software, comprising:

displaying providing a graphical user interface (GUI) with a first control field, wherein the first control field is accessible by a user only to change its state, wherein the first control field is a non-edit field that accepts a user input specifying one of a plurality of predetermined choices, wherein the GUI is functional and is presented during execution of the software, and wherein the software receives a selected one of the plurality of predetermined choices as input from the first control field;

responsive to a user input received during execution of the software requesting a change of the first control field from a non-edit field to a field with state controlled by an expression, displaying providing a second control field associated with the GUI, the second control field accepting at least one expression usable to modify the first control field;

storing the expression in memory;

mapping a result determined from the expression to a selected choice of the plurality of predetermined choices of the first control field; and setting the state of the first control field to the selected choice, wherein the selected choice is provided to the software during execution.

2. The method of claim 1, wherein the second control field is accessed from a window displayed after providing a user defined input associated with the GUI displaying the first control field.

3. The method of claim 2, wherein the user defined input is a right mouse click.

4. The method of claim 2, wherein the user defined input is a double mouse click.

5. The method of claim 2, wherein the user defined input is provided with a cursor located in a window displaying the second control field.

6. The method of claim 1, further comprising:
   determining a result from the expression accepted by the second control field;
   selecting a choice of the first control field according to a mapping of results of the expression to selectable choices of the first control field; and
   setting a state of software according to the selected choice for the first control field.

7. The method of claim 1, wherein the first control field comprises at least one check box.

8. The method of claim 1, wherein the first control field comprises a list field.

9. The method of claim 1, wherein the expression provided for the second control field maintains at least some parameters of the first control field.

10. The method of claim 1, wherein the first control field operates to configure a number of hierarchically linked elements.

11. The method of claim 1, wherein the first control field sets parameters of modules defined by a high-level modeling system and the modules define circuitry that can be programmed into a field programmable gate array (FPGA).

12. The method of claim 1, further comprising:
    inactivating the first control field, during execution of the software, when the second control field modifies the state of the first control field.

13. A computer-readable medium having stored thereon a plurality of instructions, the plurality of instructions including instructions which, when executed by a processor, cause the processor to perform a method for interfacing with software, comprising:

receiving an access control request from a user in response to a non-editable control field being displayed, the access control request indicating the user's desire to provide an expression to modify the non-editable control field, wherein the non-editable control field accepts a user input specifying one of a plurality of predetermined parameters;

receiving, an expression from the user in an editing control field displayed as part of a graphical user interface (GUI) in response to the access control request, the expression enabling modifying at least one of the predetermined parameters of the non-editable control field; and storing the expression in memory.

14. The method of claim 13, wherein the access control request comprises of the following: a right mouse click, or a double mouse click.

15. The method of claim 14, wherein the access control request is provided with a curser located on the second control field.

16. The method of claim 13, wherein the non-editable control field can be accessed by a user only to change its state.

17. The method of claim 13, wherein the non-editable control field comprises at least one of the following: a check box and a list field.

18. A computer-readable medium having stored thereon a plurality of instructions, the plurality of instructions including instructions which, when executed by a processor, cause the processor to perform a method for interfacing with software, comprising:

providing a graphical user interface (GUI) with an editing control field;

responding to data received from the editing control field of the GUI by modifying parameters of a non-editable control field associated with the GUI, wherein the parameters are modified during execution of the software and the software receives the modified parameters for the non-editable control field during execution; and storing the modified parameters of the non-editable control field in memory, wherein the non-editable control field is accessed from a window displayed after providing a user defined input associated with the GUI displaying the editing control field.

19. The method of claim 18, wherein the data comprises an expression that is a valid computer language code word of the software.

* * * * *